United States Patent [19]

Rosemann

[11] Patent Number: 4,715,250
[45] Date of Patent: Dec. 29, 1987

[54] ROTARY CUTTING CYLINDER AND METHOD OF MAKING SAME

[76] Inventor: Thomas J. Rosemann, 993 Barbizon, Manchester, Mo. 63021

[21] Appl. No.: 879,617

[22] Filed: Jun. 27, 1986

[51] Int. Cl.⁴ .......................... B21K 5/12; B26D 1/62
[52] U.S. Cl. .................................... 76/101 A; 83/674; 83/698
[58] Field of Search ................. 83/663, 664, 674, 698; 76/101 A; 144/230, 218, 172, 174

[56] References Cited

U.S. PATENT DOCUMENTS

| | | | |
|---|---|---|---|
| 3,251,256 | 5/1966 | McGrath | 83/674 |
| 3,793,918 | 2/1974 | Huffman | 83/698 |
| 4,131,047 | 12/1978 | Scriber et al. | 83/698 |
| 4,594,928 | 6/1986 | Thomas et al. | 83/698 |
| 4,671,154 | 6/1987 | Thomas et al. | 83/698 |

FOREIGN PATENT DOCUMENTS 192954 11/1964 Sweden .............................. 144/172

Primary Examiner—Paul A. Bell
Assistant Examiner—Hien H. Phan
Attorney, Agent, or Firm—Rogers, Howell, Moore & Haferkamp

[57] ABSTRACT

A rotary cutting cylinder comprising a generally cylindrical central section, the central section having a plurality of longitudinally spaced grooves, and at least one longitudinal slot having opposing sidewalls crossing the grooves. A cutting rule and mounting bar are positioned in the slot. The mounting bar has a plurality of set screws aligned with the grooves in the cylinder so that a tool can be inserted in the grooves to operate the set screws to urge the cutting rule and mounting bar against opposite walls of the slot to engage the cutting rule in the slot.

22 Claims, 15 Drawing Figures

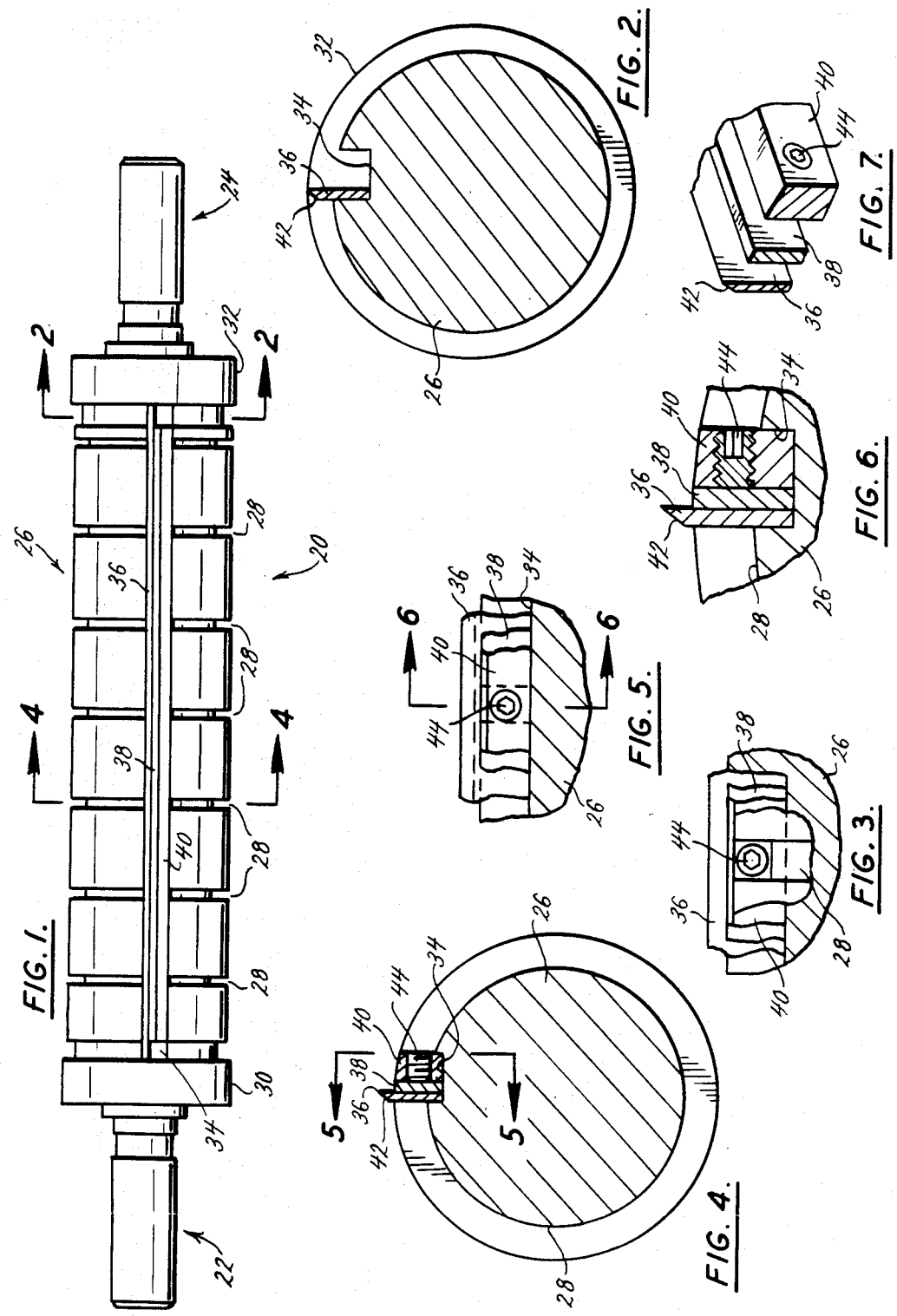

ROTARY CUTTING CYLINDER AND METHOD OF MAKING SAME

BACKGROUND AND SUMMARY OF THE INVENTION

This invention relates to rotary cutting cylinders and a method of making rotary cutting cylinders.

In the past, rotary cutting cylinders have been made by forming a cylinder such as on a lathe. A longitudinal slot is then made in the cylinder to receive a cutting rule. Several tangential notches are then milled into the cylinder, adjacent the slot. The notches are spaced along the length of the slot. The notches are carefully milled so that the bases of the notches form flat faces parallel to the walls of the slot. A threaded hole is made through the face at the base of each notch, into the slot. Set screws are then threaded into the holes, into the slot, to engage the cutting rule and secure the rule in the slot.

Several different forming steps are required to make rotary cutting cylinders according to this prior method. Thus, the prior method is both time consuming and expensive, and requires expensive equipment and skilled labor. The resulting rotary cutting cylinders have thus been expensive.

The inventors has made a new rotary cutting cylinder and a method of making rotary cutting cylinders that reduces the number of forming steps, shortens the manufacturing time, and requires less equipment and less labor than the prior methods of making such cylinders. The resultant cutting cylinder is of simple construction and is less expensive than the prior cutting cylinders.

According to the inventor's method, a cylinder is formed, such as on a lathe. During this forming step, a number of longitudinally spaced grooves are formed in the cylinder. These grooves preferably extend circumferentially around the cylinder so that they can be formed with the lathe. However, partial grooves, tangential cuts, or notches can be made instead. Then, a longitudinal slot is formed in the cylinder, crossing the grooves. This slot is wide enough to receive a cutting rule, a stiffening shim, and a mounting bar. The mounting bar is a rectangular cross-section bar with set screws spaced at regular intervals. This mounting bar is a stock item that can be trimmed to fit the slot. The grooves in the cylinder are spaced complementary to the set screws so that a tool can be inserted in the groove to tighten and loosen the set screws. When the set screws are tightened, they push the cutting rule and mounting bar against the opposite walls of the slot, frictionally engaging the cutting rule and mounting bar in the slot.

The rotary cutting cylinder is thus formed in two steps, eliminating the step of milling notches and the step of forming threaded holes for set screws. This reduces the amount of labor required to form the cylinder. The resulting rotary cutting cylinder is of simple and reliable construction.

BRIEF DESCRIPTION OF THE DRAWINGS

FIG. 1 is a side elevation view of a first embodiment of a rotary cutting cylinder constructed according to the principles of this invention, showing a cutting rule mounted therein;

FIG. 2 is a cross-sectional view of the end of the rotary cutting cylinder taken along the plane of line 2—2 in FIG. 1;

FIG. 3 is a partial sectional view of the rotary cutting cylinder, through one of the grooves in the cylinder;

FIG. 4 is a cross-sectional view of the rotary cutting cylinder, through one of the grooves, taken along the plane of line 4—4 in FIG. 1;

FIG. 5 is a partial cross-sectional view of the rotary cutting cylinder taken along the plane of line 5—5 in FIG. 4, showing the mounting bar in the slot;

FIG. 6 is a partial cross-sectional view of the rotary cutting cylinder, through the slot, taken along the plane of line 6—6 in FIG. 5;

FIG. 7 is a partial expanded view of the cutting rule, shim, and mounting bar as they would be placed in the slot in the cylinder;

DETAILED DESCRIPTION OF THE PREFERRED EMBODIMENT

Figure 8:
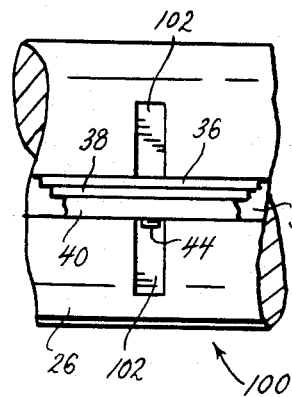
FIG. 8 is a partial side elevation view of a second embodiment of a rotary cutting cylinder constructed according to the principles of this invention.

A first embodiment of a rotary cutting cylinder constructed according to the principles of this invention, indicated generally as 20 in FIG. 1, is shown in FIGS. 1-7. Cutting cylinder 20 has left and right ends 22 and 24 for mounting cutting cylinder 20 in a machine. Cutting cylinder 20 has a central section 26 of enlarged diameter. A number of grooves 28 are longitudinally spaced along central section 26 of cutting cylinder 20. These grooves 28 preferably extend completely around the circumference of cutting cylinder 20, so that cutting cylinder 20, including grooves 28, can be conveniently formed on a lathe in one operation. However, as shown in the other embodiments described below, partial grooves, tangential cuts, or notches can be u sed instead of grooves 28. Drive rolls 30 and 32 can be press fit onto cutting cylinder 20 at opposite ends of central section 26.

A longitudinal slot 34 is formed in cutting cylinder 20, crossing grooves 28. Slot 34 is wide enough to accommodate a cutting rule 36, a shim 38, and a mounting bar 40. Cutting rule 36 has a beveled cutting edge 42 protruding sufficiently from the profile of central section 26 to cut, for example, a web material pressed against it. Shim 38 helps to fill slot 34 and stiffen cutting rule 36 and prevent it from warping. Mounting bar 40 has a generally rectangular cross-section. A number of set screws 44 are spaced along the length of the mounting bar 40. Set screws 44 are preferably threaded sections mounted flush in mounting bar 40 but operable to protrude from mounting bar 40. Each screw 44 has a hexagonal opening 46 for receiving an allen wrench to tighten and loosen screws 44. The grooves 28 are spaced complementary to the screws 44. Mounting bar 40 is preferably made from a commercially available stock, and cut to fit in slot 34.

Cutting rule 36, shim 38, and mounting bar 40 are positioned in slot 34, with set screws 44 in mounting bar 40 aligned with grooves 28 in central section 26. Set screws 44 are tightened, forcing cutting rule 36 and shim 38 forwardly and mounting bar 40 rearwardly in slot 34, against opposite walls of slot 34, to frictionally engage cutting rule 36, shim 38, and mounting bar 40 in slot 34.

Cutting rule 36 can be quickly and easily removed, for example for replacement, by loosening the set screws 44 exposed in the grooves 28.

The rotary cutting cylinder 20 is thus made in a fast, simple, and inexpensive two step operation of forming the grooved cylinder and making a longitudinal slot in the cylinder to receive the cutting rule, or vice versa. The resulting cylinder is of simple construction, reliable, and easy to use.

Figure 9:
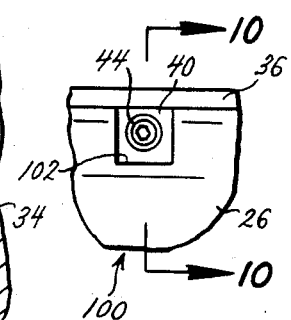
FIG. 9 is a partial sectional view of the rotary cutting cylinder through one of the notches in the cylinder.
Figure 10:
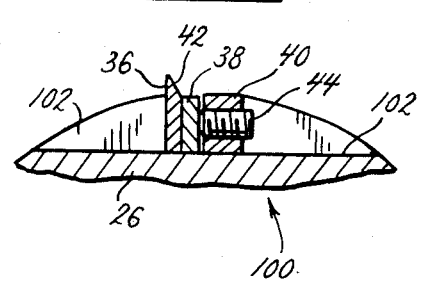
FIG. 10 is a partial cross-sectional view of the rotary cutting cylinder, through the slot, taken along the plane of line 10—10 in FIG. 9.

A second embodiment of a rotary cutting cylinder constructed according to the principles of this invention, indicated generaly as 100 in FIG. 8, is shown in FIGS. 8-10. Cutting cylinder 100 is identical in construction in cutting cylinder 20, with like parts having the same reference numerals except that instead of a plurality of circumferential grooves 28, cutting cylinder 100 has a plurality of tangential cuts 102. Tangential cuts 102 extend across and communicate with slot 34 in cutting cylinder 100. Tangential cuts 102 can be made before or after slot 34 is made. Tangential cuts 102 are simple to make, and eliminate the difficult and time consuming operations of the prior art of forming a notch having a face at the base of the notch parallel to the slot and forming a threaded hole through this face.

As in the first embodiment described above, cutting rule 36, shim 38, and mounting bar 40 are positioned in slot 34. Like grooves 28, tangential cuts 102 are spaced complementary to screws 44 in mounting bar 40. Set scress 44 in mounting bar 40 are aligned with tangential cuts 102 and are tightened to frictionally engage cutting rule 36, shim 38, and mounting bar 40 in slot 34.

Figure 11:
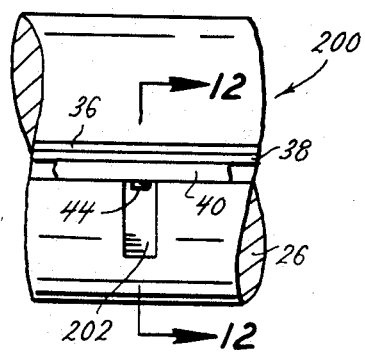
FIG. 11 is a partial side elevation view of a third embodiment of a rotary cutting cylinder constructed according to the principles of the invention.
Figure 12:
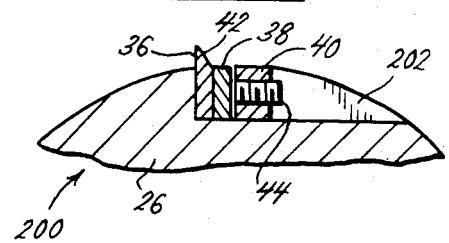
FIG. 12 is a partial cross-sectional view of the rotary cutting cylinder, through the slot, taken along the plane of line 12—12 in FIG. 11.

A third embodiment of a rotary cutting cylinder constructed according to the principles of this invention, indicated generally as 200 in FIG. 11, is shown in FIGS. 11 and 12. Cutting cylinder 200 is identical in construction to cutting cylinder 20, with like parts having the same reference numerals, except that instead of a plurality of circumferential grooves 28, cutting cylinder 200 has a plurality of notches 202. Notches 202 open into and communicate with slot 34 in cutting cylinder 200. Notches 202 can be made before or after slot 34 is made. Notches 202 have vertical sidewalls and a flat bottom. Notches 202 are simple to make, and eliminate the difficult and time consuming operations of the prior art of forming a notch having a face at the base of the notch parallel to the slot and forming a threaded hole through this face.

As in the first embodiment described above, cutting rule 36, shim 38, and mounting bar 40 are positioned in slot 34. Like grooves 28 notches 202 are spaced complementary to screws 44 in mounting bar 40. Set screws 44 in mounting bar 40 are aligned with notches 202 and are tightened to frictionally engage cutting rule 36, shim 38, and mounting bar 40 in slot 34.

Figure 13:
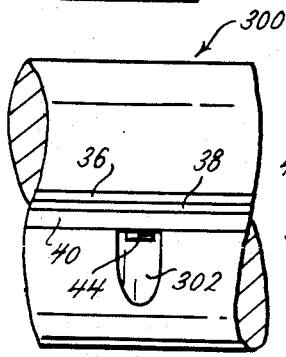
FIG. 13 is a partial side elevation view of a fourth embodiment of a rotary cutting cylinder constructed according to the principles of this invention.
Figure 14:
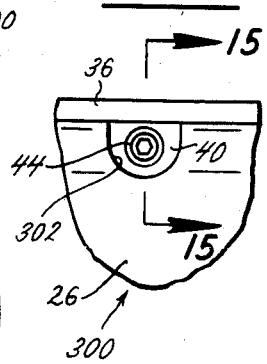
FIG. 14 is a partial sectional view of the rotary cutting cylinder, through one of the notches in the cylinder; and, FIG. 15 is a partial cross-sectional view of the rotary cutting cylinder, through the slot, taken along the plane of line 15—15 in FIG. 14.
Figure 15:
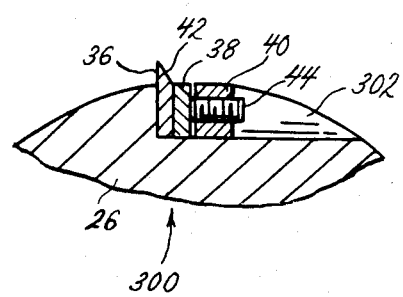

A fourth embodiment of a rotary cutting cylinder constructed according to the principles of this invention, indicated generally as 300 in FIG. 13, is shown in FIGS. 13-15. Cutting cylinder 300 is identical in construction to cutting cylinder 20, with like parts having the same reference numerals, except that instead of a plurality of circumferential grooves 28, cutting cylinder 200 has a plurality of notches 302. Notches 302 open into and communicate with slot 34 in cutting cylinder 300. Notches 302 can be made before or after slot 34 is made. Notches 302 have curved sidewalls and bottoms. Notches 302 are simple to make, and eliminate the difficult and time consuming operations of the prior art of forming a notch having a face at the base of the notch parallel to the slot and forming a threaded hole through this face.

As in the first embodiment described above, cutting rule 36, shim 38, and mounting bar 40 are positioned in slot 34. Like grooves 28 notches 302 are spaced complementary to screws 44 in mounting bar 40. Set screws 44 in mounting bar 40 are aligned with notches 302 and are tightened to frictionally engage cutting rule 36, shim 38, and mounting bar 40 in slot 34.

There are various changes and modifications which may be made to the invention as would be apparent to those skilled in the art. However, these changes or modifications are included in the teaching of the disclosure, and it is intended that the invention be limited only by the scope of the claims appended hereto.

We claim:

1. A method of making a rotary cutting cylinder comprising the steps of:

forming a generally cylindrical section having a plurality of longitudinally spaced grooves, with at least a portion of each longitudinally spaced groove being generally tangential to the cylindrical section;

making a longitudinal slot in the cylindrical section crossing the grooves, the slot having opposing sidewalls;

inserting a cutting rule in the slot;

inserting a mounting bar in the slot, the mounting bar having a plurality of longitudinally spaced set screws therein, and aligning set screws with the grooves in the cylindrical section;

tightening the set screws to urge the cutting rule against one sidewall of the slot and for urging the mounting bar away from the cutting rule and against the opposite sidewall of the slot to secure the cutting rule and the mounting bar in the slot.

2. The method of claim 1 wherein the mounting bar is a commercially available stock, the method further comprising cutting the stock to fit the slot.

3. The method of claim 1 further comprising the step of inserting a shim into the slot between the cutting rule and mounting bar before tightening the set screws.

4. The method of claim 1 wherein the step of forming a generally cylindrical section having a plurality of longitudinally spaced grooves is done on a lathe.

5. The method of claim 1 wherein the step of tightening the set screws comprises inserting a tool in the grooves to engage the set screws.

6. A method of making a rotary cutting cylinder comprising the steps of:

forming a generally cylindrical section;

making a longitudinal slot in the cylindrical section, the slot having opposing sidewalls;

forming a plurality of longitudinally spaced grooves in the cylinder generally tangential to the cylindrical section and in communication with the slot;

inserting a mounting bar in the slot, the mounting bar having a plurlaity of longitudinally spaced set screws therein, and aligning the set screws with the grooves in the cylindrical section;

tightening the set screws to urge the cutting rule against one sidewall of the slot and to urge the mounting bar against the opposite sidewall of the slot to secure the cutting rule and the mounting bar in the slot.

7. The method of claim 6 wherein the step of forming the longitudinally spaced grooves comprises making tangential cuts in the cylindrical section crossing the slot and in communication with the slot.

8. The method of claim 6 wherein the step of forming the longitudinally spaced grooves comprises making a plurality of notches in the cylindrical section opening into and communicating with the slot.

9. A rotary cutting cylinder comprising:

a generally cylindrical central section, the central section having a plurality of longitudinally spaced grooves, at least a portion of each longitudinally spaced groove being generally tangential to the central section and at least one longitudinal slot having opposing sidewalls communicating with the grooves;

a cutting rule in the slot, the cutting rule having a cutting edge protruding from the slot; and, a mounting bar in the slot adjacent the cutting rule, the mounting bar including means for urging the cutting rule against one sidewall of the slot and for urging the mounting bar away from the cutting rule and against the opposite sidewall of the slot to secure the cutting rule in the slot, said urging means aligned with the grooves in the cylinder.

10. The rotary cutting cylinder of claim 9 wherein the longitudinally spaced grooves extend around the circumference of the central section.

11. The rotary cutting cylinder of claim 9 wherein the longitudinally spaced grooves comprise tangential cuts in the cylinder crossing and communicating with the slot.

12. The rotary cutting cylinder of claim 9 wherein the longitudinally spaced grooves comprise notches in the cylinder opening into and communicating with the slot.

13. The rotary cutting cylinder of claim 9 wherein the means for urging the cutting rule and mounting bar against opposite walls of the slot comprise a plurality of set screws in the mounting bar, each set screw aligned with a groove in the cylinder, the set screws operable to urge the cutting rule and, the mounting bar against opposite walls of the slot to secure the cutting rule and mounting bar in the slot.

14. The rotary cutting cylinder of claim 13 further comprising a shim in th eslot between the cutting rule and the mounting bar.

15. The rotary cutting cylinder of claim 13 wherein each set screw has a hexagonal recess for engaging a wrench for operating the set screw.

16. An improved rotary cutting cylinder of the type having a slot with opposing sidewalls for mounting a cutting rule therein, the improvement comprising:

a mounting bar in the slot adjacent the cutting rule, the mounting bar comprising a plurality of set screws therein and, a plurality of longitudinally spaced grooves in and generally tangential to the cylinder, the grooves aligned with the set screws in the mounting bar to allow access to the set screws to tighten each set screw to urge the cutting rule against one sidewall of the slot and to urge the mounting bar against the opposite sidewall of the slot to secure the cutting rule in the slot.

17. The improved rotary cutting cylinder of claim 16 wherein the longitudinally spaced grooves extend around the circumference of the cylinder.

18. The rotary cutting cylinder of claim 16 wherein the longitudinally spaced grooves comprises tangential cuts in the cylinder crossing and communicating with the slot.

19. The rotary cutting cylinder of claim 16 wherein the longitudinally spaced grooves comprise notches in the cylinder opening into and communicating with the slot.

20. The improved rotary cutting cylinder of claim 16 further comprising a shim in the slot between the cutting rule and the mounting bar.

21. The improved rotary cutting cylinder of claim 16 wherein each set screw has a hexagonal recess for engaging a wrench for operating the set screw.

22. A rotary cutting cylinder for receiving and mounting a replacable cutting rule and a mounting bar including a plurality of axially spaced set screws, the cutting cylinder comprising:

a generally cylindrical central section, the central section having a least one longitudinal slot having opposing sidewalls, the slot adapted to receive the cutting rule and mounting bar, the cylinder further comprising a plurality of longitudinally spaced grooves communicating with the slot, and generally tangential to the central section, the grooves spaced complementary to the spacing of the set screws in the mounting bar, the grooves adapted to provide access to the set screws when the cutting rule and mounting bar are positioned in the slot.

* * * * *